US006606644B1

(12) United States Patent
Ford et al.

(10) Patent No.: US 6,606,644 B1
(45) Date of Patent: Aug. 12, 2003

(54) SYSTEM AND TECHNIQUE FOR DYNAMIC INFORMATION GATHERING AND TARGETED ADVERTISING IN A WEB BASED MODEL USING A LIVE INFORMATION SELECTION AND ANALYSIS TOOL

(75) Inventors: Daniel A. Ford, Los Gatos, CA (US); Reiner Kraft, Gilroy, CA (US); Gaurav Tewari, Cambridge, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/511,846

(22) Filed: Feb. 24, 2000

(51) Int. Cl.[7] .............................................. G06F 15/16
(52) U.S. Cl. ...................... 709/203; 709/204; 709/217; 707/3; 707/10; 707/102
(58) Field of Search ................................ 709/204, 205, 709/203, 217, 226, 224; 707/3, 102, 219, 10, 7, 5, 201

(56) References Cited

U.S. PATENT DOCUMENTS

| 630,802 | A | * | 8/1899 | Cohen et al. ............... 709/217 |
|---|---|---|---|---|
| 5,862,330 | A | * | 1/1999 | Anupam et al. ............ 709/204 |
| 5,937,037 | A | * | 8/1999 | Kamel et al. ............. 379/88.19 |
| 6,076,100 | A | * | 6/2000 | Cottrille et al. ............. 709/203 |
| 6,243,699 | B1 | * | 6/2001 | Fish ............................. 707/2 |
| 6,330,243 | B1 | * | 12/2001 | Strandberg .................. 370/396 |
| 6,346,952 | B1 | * | 2/2002 | Shtivelman ................. 345/758 |
| 6,393,412 | B1 | * | 5/2002 | Deep .......................... 705/400 |
| 6,393,460 | B1 | * | 5/2002 | Gruen et al. ................ 709/204 |
| 6,401,118 | B1 | * | 6/2002 | Thomas ...................... 709/224 |
| 6,434,599 | B1 | * | 8/2002 | Porter ........................ 709/204 |
| 6,493,703 | B1 | * | 12/2002 | Knight et al. .................. 707/3 |

\* cited by examiner

*Primary Examiner*—Ario Etienne
*Assistant Examiner*—Abdullahi E. Salad
(74) *Attorney, Agent, or Firm*—DeLio & Peterson, LLC; Kelly M. Reynolds

(57) ABSTRACT

A method and apparatus for automatically gathering, summarizing, and indexing real-time information derived from real-time communication on the Internet, such as Internet chat sessions, or any other comparable form of real-time communication on the Internet. The present invention provides live information selection and analysis and provides basic functionality of crawling, indexing and summarizing chat room data, as well as generating messages, such as advertisements, responsive to the subject matter of the communication.

23 Claims, 4 Drawing Sheets

Welcome to LISA

Current Activity:

| Msg. | Time | User | E-Mail | URL | Message Text |
|---|---|---|---|---|---|
| 1524 | 20:18 PDT | Gaurav | gtewari@mit.com | http://www.mit.com/~gt | "bye everyone, I have to go now" |
| 1525 | 20:19 PDT | Karin | karin@ibm.com | <unknown> | "bye Gaurav, see you later! I am leaving now too!" |
| 1525 | 20:20 PDT | Reiner | reiner@garlic.com | http://www.ibm.com/~rsk | "Hi! Does anyone know anything about IBM stock rumors?" |
| 1526 | 20:20 PDT | John | john@hotmail.com | <unknown> | "Hello everyone" |
| 1527 | 20:21 PDT | Dan | <unknown> | <unknown> | "Reiner: Gaurav & Karin were talking abut IBM stock a couple of hours ago. They're not here right now, but you might want to check back later..." |
| . | | | | | |
| . | | | | | |
| 1528 | 20:22 PDT | Dan | <unknown> | <unknown> | "Hi John. Did you install Linux today, as we had discussed last week?" |

Time Now 20:22.36 PDT    LISA Started at 17:59.12 PDT

Enter Search Query: "IBM"   GO

Search Query Results:

| Msg. | Time | User | E-Mail | URL | Message Text |
|---|---|---|---|---|---|
| 1403 | 18:06 PDT | Gaurav | gtewari@mit.com | http://www.mit.com/~gt | "I heard that IBMs stock price will go up tomorrow" |
| 1407 | 18:08 PDT | Karin | karin@ibm.com | <unknown> | "Gaurav: that's probably because IBM is acquiring Lotus" |
| 1409 | 18:09 PDT | Gaurav | gtewari@mit.com | http://www.mit.com/~gt | "Karin, should I buy IBM stock today, then?" |
| 1417 | 18:11 PDT | Karin | karin@ibm.com | <unknown> | "Gaurav: That's up to you. IBM *is* a strong company." |
| 1422 | 18:16 PDT | Gaurav | gtewari@mit.com | http://www.mit.com/~gt | "Karin: thanks for your insight about IBM" |
| 1525 | 20:20 PDT | Reiner | reiner@garlic.com | http://www.ibm.com/~rsk | "Hi! Does anyone know anything about IBM stock rumors?" |
| 1527 | 20:21 PDT | Dan | <unknown> | <unknown> | "Reiner: Gaurav & Karin were talking about IBM stock a couple of hours ago. They're not here right now, but you might want to check back later..." |
| . | | | | | |
| . | | | | | |

Fig. 2

SYSTEM AND TECHNIQUE FOR DYNAMIC INFORMATION GATHERING AND TARGETED ADVERTISING IN A WEB BASED MODEL USING A LIVE INFORMATION SELECTION AND ANALYSIS TOOL

BACKGROUND OF THE INVENTION

1. Field of the Invention

The present invention is generally related to information retrieval technologies in the context of Internet based communication media and in particular to a system and method for real-time information gathering and management.

2. Description of Related Art

The seminal importance of the Internet as a generalized communication medium has been clear from the very outset. As the Internet has surged in popularity it has begun manifesting itself in nontraditional ways, the scope of which had never been fully anticipated. In particular, with the exponential rise in the number of Internet users, real-time Web based interaction, such as that seen in Internet "chat", has emerged as an amazingly popular and pervasive mode of communication.

On the Internet, the term "chatting" is used to refer to the act of "talking" to other people who are using the Internet at the same time. Typically, "chatting" involves the broadcast, multicast, or unicast of messages, typed in real-time, amongst a group of users occupying the same space (i.e., connected to the same server or related group of servers) on the Internet. The users themselves may be situated in different geographical locales and may be connected using any number of different client programs, browsers, or internet service providers ("ISP"). The key point is that a single Internet site (the "chat site") serves as a common repository for all messages. Chats may be ongoing, or scheduled, and users may enter and leave the chat site at will.

Typically, most chats are focused on a particular topic or theme. A given chat-site may be a host to multiple chats, each corresponding to a different theme yet taking place at the same time in different "chat rooms" which are essentially specialized sub-domains within the broader chat-site. Hence, participants within the same chat-room generally share some common interest or concern which brings them together.

Chats are hosted by online services (such as America Online), by bulletin board services and by Web sites. Many Web sites exist exclusively for the purpose of conducting chats. Most chat sites use a popular protocol called "Internet Relay Chat" (IRC), for client-server handshaking and subsequent client-server and client-client interaction. IRC was first made public in RFC 1459, released in May 1993. Besides the exchange of text messages, a chat may also include the use of sound and graphics, provided that the bandwidth capability and appropriate programming are accessible.

Currently, most chat activity appears to be informal and recreational. However, specialized channels where professionals exchange valuable opinions and engage in constructive dialogues are becoming increasingly prevalent.

Despite the emerging popularity of real-time communication using the Internet, the implications of this paradigm for commercial advertising purposes have largely been overlooked. Most advertising on the Web is pre-defined and pre-meditated by the advertiser. In some instances, however, efforts have been made to dynamically alter the advertising so as to increase its relevance to the user. The most notable example of this is in the case of search engines. Once the user enters a search query, many search engines will dynamically alter the content of the advertising banners to reflect a product that is somehow related to the user's query. For example, a user who searches for the string "computer parts", may be shown an advertising of a "COMPAQ" or "DELL", since these companies manufacture computer hardware. Although a few rudimentary measures have been taken to better customize online advertising so as to improve its relevance to the user, no general technique has been developed to do this dynamically in the context of real-time user interaction on the Internet.

Although automated Web crawling tools are widely used to index and summarize content on a regular basis, the scope of these tools are largely limited to "static" data. No general technique has been developed to deal with more "dynamic" data that is constantly changing in real-time, as is the case with Internet chat sessions. The rapid increase in popularity of online chat indicates that chat is poised to become a mainstream form of communication amongst members of online communities. As such, it is desirable to develop a technique that will make it possible to conveniently monitor and archive the content of chat sessions, and make this data accessible for subsequent analysis. Furthermore, it would also be desirable to be able to provide online advertising responsive to the content of chat sessions.

Bearing in mind the problems and deficiencies of the prior art, it is therefore an object of the present invention to provide a method and system to gather dynamic information from a real-time communication on a computer network such as the Internet.

It is another object of the present invention to provide a method and system to analyze dynamic information gathered from a real-time communication on a computer network such as the Internet.

A further object of the invention is to provide a method and a system to target a message responsive to dynamic information gathered from a real-time communication on a computer network such as the Internet.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method for automatically gathering, summarizing and indexing real-time information derived from a real-time communication on a computer network between at least a first and second client or user. In the preferred embodiment, the method comprises connecting to a server and a site where the real-time communication is taking place by opening a socket based connection using a transmission control/network (e.g., internet) protocol ("TCP/IP").

In the most preferred embodiment, opening a socket base connection using a TCP/IP comprises opening an input and output socket to the server, sending the server a first command to request a connection, receiving a unique session identification message from the server, sending a confirming unique session identification message to the server, sending a registration message to the server which comprises a user name, host name, server name, real first name and real last name, and sending a second command to the server specifying a chat room to join. A connection is made with the site of the chat room on the server and the real-time communication is monitored. In the preferred embodiment, at least one block of communication data is retrieved from the real-time communication and processed. The processing may include extracting at least one parameter from the block of communication data, the parameter consisting of a body text, title, header, e-mail address or uniform resource locator. The data is summarized by marking a parameter with a tag. In the preferred embodiment, an extensible markup language summary of the data is generated where extensible markup language tags are used to delineate the parameters.

In the preferred embodiment the method further comprises storing the summarized data in a data base. It is preferred that the data base be adapted to be queried for at least one key word associated with the block of communication data. In the preferred embodiment, the data base is queried for the occurrence of a key word and a data base entry corresponding to the key word is identified and displayed.

In one aspect of the preferred embodiment, after summarizing the block of communication data, at least one key word is identified to be detected during the real-time communication. The summarized data is analyzed for the occurrence of the key word and a message selected from a message data base which is associated with the key word is then interjected to the site of the real-time communication where it is detectable by clients. The message may consist of image banners, video streams or audio presentations and may also be personalized for a specific client. In the preferred embodiment a message may be mapped to more than one key word and a key word may be mapped to more than one message.

In another aspect, the present invention is directed to an article of manufacture comprising a computer usable medium having computer readable program code means embodied therein for causing a computer to automatically gather, summarize and index real-time communication on a computer network between at least a first and second user. The computer readable program code means in the article of manufacture comprises computer readable program code means for causing a computer to connect with at least one server and a site where a real-time communication is taking place, to monitor the real-time communication, to retrieve a block of communication data from the communication, to process and extract at least one parameter from the communication data, and to summarize the data and tag a parameter. In the preferred embodiment, the article of manufacture further comprises computer readable program code means for causing a computer to store the summarized block of communication data in the data base, to query the data base for the occurrence of a key word, to identify a data base entry corresponding to the summarized block of data and key word, and to display the data base entry on a screen visible to a client.

In the preferred embodiment, the article of manufacture further comprises computer readable program code means for causing a computer to identify a key word to be detected during the real-time communication and to analyze the summarized data for the occurrence of the key word. It is preferred that the article further include computer readable program code means for causing a computer to select a message associated with a key word from a message data base, and interject a message into the real-time communication which can be detected by a client.

In another aspect, the present invention is directed to a computer program product comprising a computer musical medium having computer readable program code means embodied in the medium for causing a computer to automatically gather, summarize and index real-time information derived from a real-time communication on a computer network between a first and second client. In the preferred embodiment, the computer program product has computer readable program code means for causing a computer to connect with a server and a site where a real-time communication is taking place, to monitor the real-time communication and retrieve a block of communication data, to process the data and extract at least one parameter from the data, and to summarize the data and identify the parameter. It is also preferred that the computer program product comprise computer readable program code means for causing a computer to store the summarized block of communication in a data base, to query the data base for the occurrence of a key word, to identify a data base entry corresponding to the key word, and to display the data base entry on a screen visible to a client. In the preferred embodiment, the computer program product further comprises computer readable program code means for causing a computer to identify a key word to detect during the real-time communication, to analyze the summarized data for the occurrence of the key word, to select at least one message from a data base associated with the key word and to interject the message back to the site of the real-time communication such that the message is detectable by a client.

In a further aspect the present invention is directed to a method for targeting a message to at least one client in the context of a real-time communication on a computer network. In the preferred embodiment the method comprises connecting to a site of a real-time communication on the network, monitoring the communication for the occurrence of a key word, generating a message responsive to the key word, and interjecting the message onto the site of the real-time communication the message being detectable by at least one participant in the communication.

Although the present invention may be employed on a local intra-net, it is preferably directed toward use on the Internet.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention, its organization and method of operation, may best be understood by reference to the detailed description which follows taken in conjunction with the accompanying drawings in which:

FIG. 2 is a pictorial representation of a typical graphic display of the present invention.

DESCRIPTION OF THE PREFERRED EMBODIMENT(S)

Figure 1:
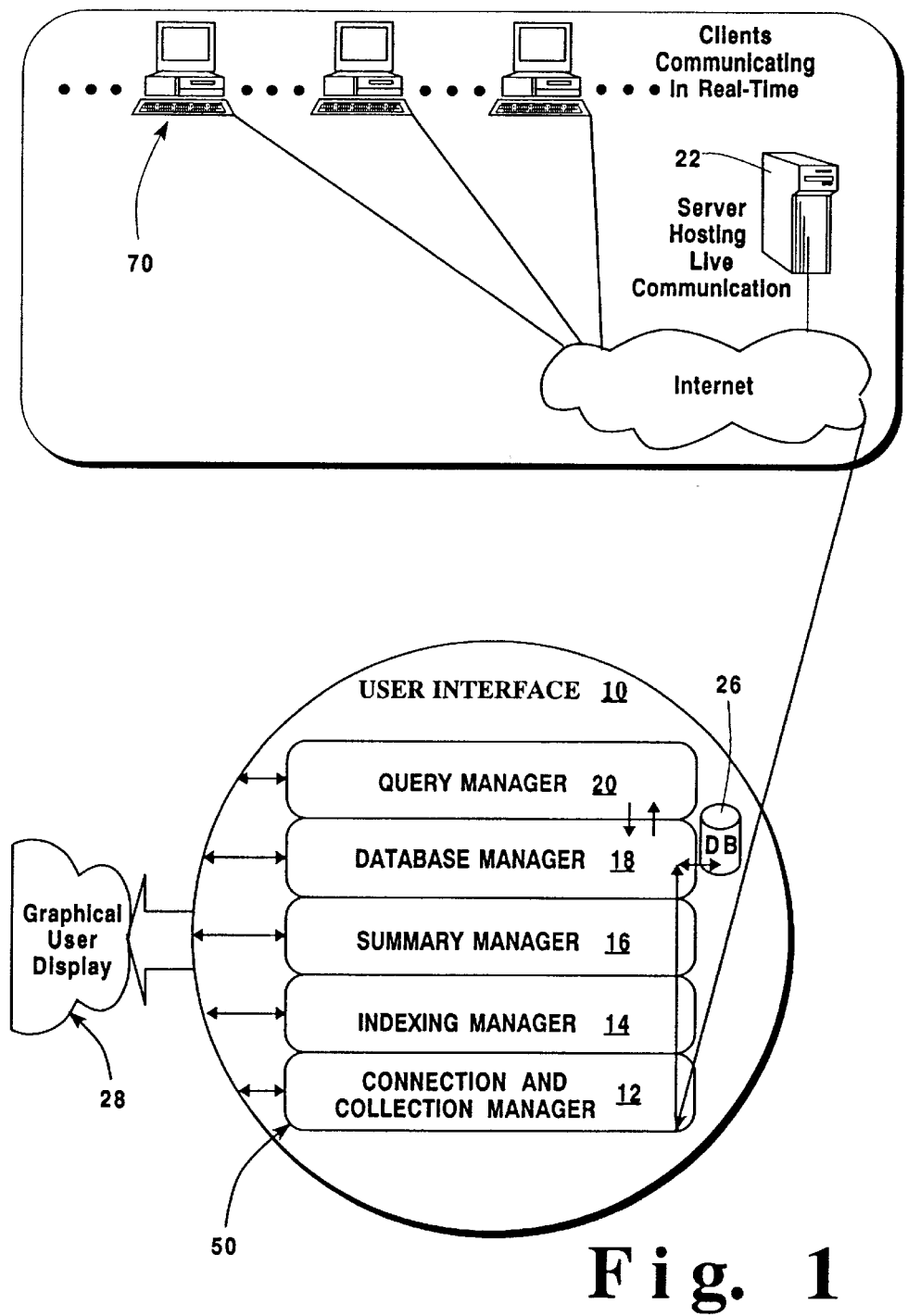
FIG. 1 is a schematic diagram of the typical components of the present invention.

In describing the preferred embodiment of the present invention, reference will be made herein to FIGS. 1–4 of the drawings in which like numerals refer to like features of the invention. Features of the invention are not necessarily shown to scale in the drawings.

The present invention provides a method and apparatus for automatically gathering, summarizing, and indexing real-time information derived from real-time communication on the Internet, such as Internet chat sessions, and to make that data readily available for immediate analysis and use such as targeted advertising. Since the present invention provides live information selection and analysis, for convenience purposes, the present invention may be referred to herein as "LISA."

The ability to monitor, archive and use the content of online chat sessions can potentially be of immense importance to a wide variety of individuals and organizations. The present invention will provide the basic functionality of crawling, indexing and summarizing the data. Using the present invention, interested individuals and organizations will be able to conduct detailed and customized analyses that will provide them with novel and valuable insights. For example, several uses of the present invention are envisioned.

1. Parental Supervision

Concerned parents who do not have the time to personally monitor the chat conversations that their children engage in may be interested in searching for the occurrence of certain keywords in the data archives using the present invention, so as to understand the theme of such conversations.

2. Dynamic Advertising

The present invention offers a novel and exciting opportunity for online advertisers. The present invention will give advertisers the ability to dynamically monitor the conversation being held in any given chat room, and be able to display advertising banners that match the theme of the conversation, thus, eliciting greater attention and interest from users. For example, a sudden occurrence of keywords such as "car", "automobile", "drive", "convertible", "coupe", etc., may signal to an automobile manufacturer that now is an opportune time to display a banner advertising a special sale on convertible automobiles. From the perspective of the chat participants, the advertisement will be of greater relevance at that particular moment, and they will be motivated to pay greater attention to it.

3. Personal E-Mail Address and URL Retrieval

The present invention will make it trivial to collect and annotate personal E-mail addresses and uniform source locators ("URL") willingly made public by online chatters. The present invention can be configured to extract such information when indexing and summarizing the collected data.

4. Inferring Professional Opinions

By targeting the present invention upon specialized chat rooms frequented by industry professionals, it becomes possible to monitor, and possibly reference, the opinions of experts on major current issues.

5. Inferring General Public Opinions

Prominent companies and organizations can direct the present invention towards general interest chat rooms, frequented by all kinds of users, so as to be able to see what, if anything, the general public is saying about them. For instance, a company may wish to see how people feel about its proposed acquisition of another company. In this application, the present invention can be instructed to retrieve all chat messages that mention the names of the two companies.

The foregoing is just a small sampling of the functionality that the present invention is capable of facilitating. No doubt, as the present invention gains popularity and becomes widely deployed, many new and exciting uses will manifest themselves.

As shown in FIG. 1, in a first aspect, the present invention may typically comprise the following components:
A) User Interface-10
B) Connection and Collection Manager-12
C) Indexing Manger-14
D) Summary Manager-16
E) Database Manager-18
F) Query Manager-20

Unless otherwise noted the term "user" refers to the operator and operator's computer of the present invention, while the term "client" refers to a human participant and the computer of a participant in a real-time online communication.

The functionality of each of the typical LISA system components is as follows:

A) User Interface 10: User Interface 10 is the component of the system which will directly interact with the user. All interaction between the present invention and the user is mediated by the user interface 10. The user interface 10 is responsible for getting crucial configuration parameters from the user and initializing the other components of the system as appropriate.

The user interface 10 will prompt the user for the address of the server 22 where the real-time communication of interest is being held. The user has the option of either specifying a URL to be accessed using the Hyper Text Transmission Protocol ("HTTP"), or may choose to simply give the address of an Internet relay chat ("IRC") server to be accessed directly, using a sockets-based connection employing Transmission Control Protocol/Internet Protocol ("TCP/IP"). Depending upon the user's choice, the user interface 10 will automatically prompt the user for all other relevant parameters necessary to establish the connection. For instance, the user may be prompted to enter a screenname, by which the present invention should register with the chat server if the server 22 requires such a specification, and other such essential information.

The user interface 10 will also allow the user to optionally customize the indexing and summarizing operations, and personalize these according to the user's preferences. For instance, the user may wish to explicitly specify the attributes that ought to be included in a summary, and can thus augment or override the default options. The user can also customize the graphical presentation and formatting of the data and the search query results using the user interface 10.

B) Connection and Collection Manager 12: The Connection and Collection Manager 12 is a software component of the present invention which is responsible for actually connecting to the server of interest and then collecting the relevant information.

Depending upon the user's specifications, Connection and Collection Manager 12 can connect to server 22 of interest in one of two ways:

1) URL Based Connection using HTTP: In this case the user will specify a string of the form "http:// . . . " The Connection and Collection Manager 12 may then use Java Networking tools to open a "URL connection" to the server. In many cases, this will require that the user should already have registered manually with the server, and have specified a user-name and password with which to initiate the connection.

The Connection and Collection Manager 12 will, to an extent, emulate a Web browser (which would be the normal way to connect to a server using HTTP). In order to accomplish this, the Connection and Collection Manager 12 will intercept all "cookies" sent from the server (which thinks that it is connected to a browser), and will extract the name and value fields of these cookies.

"Cookies" are a way for a server (or a servlet running on a server) to send information to a client computer to store, and for the server to later receive its data from that client computer. Servlets send cookies to clients by adding fields to HTTP response headers. Clients (or client computers) are expected to automatically return cookies by adding fields to HTTP request headers. Each HTTP request and response header is named and has a single value. For example, a cookie could have a header named "chatroom" with a value "Politics", indicating to the calling application that the user wants to join the chat room called "Politics". For all future HTTP requests made to the server, the Connection and Collection Manager 12 will add the appropriate fields to HTTP request headers, thus emulating a browser application.

In order to connect successfully, the Connection and Collection Manager 12 will probably need to specify a user-name and a password that are already known by the server, and which correspond to an existing account. The Connection and Collection Manager 12 will then need to specify which "chat" room it wants to join. The exact methodology by which the Connection and Collection Manager 12 will specify these parameters will vary somewhat from one server to another, and the Connection and Collection Manager 12 must usually be manually pre-configured if a URL-based connection is desired. These parameters will be specified to the server 22 by the Connection and Collection Manager 12, by appending cookie fields to HTTP request headers. Hence, the pre-configuration will usually require the user to specify the names and values of such cookies fields, since it is not always possible for the Connection and Collection Manager 12 to infer these directly.

For example, suppose the user instructs the Connection and Collection Manager 12 to open a URL based connection to the server "http://www.wbs.net." Further, suppose that the user is interested in connecting to a room called "talk.politics.misc," using screen name: "gaurav2000" and password: "ibmchat." In this case, when the Connection and Collection Manager 12 attempts to open a URL based connection to http://www.wbs.net using these parameters, the server returns a number of cookies. The Connection and Collection Manager 12 will carefully collect these cookies, extract their name and value fields and append them to all future HTTP request headers, ultimately generating an elaborate URL of the form:

http://chat9.go.com:6666/webchat3.so!Room=talk, politics.misc&handle=gaurav2000&mu= 142cadf11820bc29d2f7f8a90245851843fe83d885433 892&chatmode=push&zipcode=95120&dd= 00000000000000000000&n ofrills=1&fsection=output Connecting to this URL allows the Connection and Collection Manager 12 to successfully listen to all conversation being held within the "talk.politics.misc" room. To all other users, the Connection and Collection Manager 12 appears to be just another user, with the screen name: gaurav2000.

2) Socket Connection using TCP/IP: The limitation of a URL based connection using HTTP is that it is not generalizable to all servers, and can require significant user configuration. Additionally, in the URL-based connection model a chat server may insist on sending an applet to the Connection and Collection Manager 12 since, in this model, the Connection and Collection Manager 12 appears to be a Web browser. In such cases, a URL-based approach will not work, unless the functionality of the Connection and Collection Manager 12 is extended to allow it to accept and execute applets that communicate with servlets.

A socket based connection using TCP/IP overcomes many of the limitations of a URL-based approach, and is far more general. Typically, a socket-based approach is the preferred connection method for the present invention.

The vast majority of Internet chat servers follow the Internet Relay Chat protocol. The present invention's socket-based approach involves a direct socket connection to the server 22, and registering and connecting using standard IRC commands. The user will still, however, need to explicitly specify the name of the server to connect to, the port to connect at (usually in the range of 6666–7000 for IRC chat servers), what screen-name LISA should be visible as, which room to join, and other such essential parameters.

In attempting to open a socket-based connection to a server (say "chat.cnn.com," at port 7000), the Connection and Collection Manager 12 will follow the sequence of steps:

(i) Connection and Collection Manager 12 will open an input and output socket to the server, for reading and writing purposes respectively.

(ii) Connection and Collection Manager 12 will attempt to send the server a command indicating that it wants to connect. For instance, it can send the server a "NICK" message. A "NICK" message is used to give a client a nickname or change the previous one. The syntax of a "NICK" command is: "NICK <desired nickname>."

(iii) Upon receiving a "NICK" command, the server will become cognizant of the presence of the Connection and Collection Manager 12. The server will then send the Connection and Collection Manager 12 a unique session ID that will identify the client for this chat session. Specifically, the server will send the Connection and Collection Manager 12 a message of the form "PING <unique session id>."

(iv) Having received a "PING" message from the server, the Connection and Collection Manager 12 must respond with a corresponding "PONG" message of the format: PONG <unique session id>. This confirms to the server that the client is alive and that the client is aware of the unique session ID that has been allocated to it.

(v) Immediately after sending the PONG response, the Connection and Collection Manager 12 must complete "registration" with the server now that it knows how to identify itself (using the allocated unique session ID). A client is considered to be "registered" after both a valid NICK and USER command have been received from the client. As such, the Connection and Collection Manager 12 will now send the server a USER message to complete registration (the NICK message had already been sent in step (i)). The USER message is used at the beginning of connection to specify the username hostname, servername and realname of a new user. Hence the Connection and Collection Manager 12 will send a USER message of the form: "USER <username> <hostname> <servername>: <real firstname> <real lastname>."

Since it is easy for a client to lie about its username by relying solely on the USER message, many chat servers will actually attempt to verify the client's identity using an "Identity Server". If the host which a user connects from has such a server enabled, the user name is set to that in the reply from the "Identity Server". In the event that Identity server verification is not possible, some chat servers will refuse to allow the client to connect. Others will be more lenient, and will simply prefix the username of the client with a tilde ("~"), or other such distinguishing character to indicate that the client has not been authenticated, and allow the client to connect.

(vi) Having registered, the Connection and Collection Manager 12 must specify which chat room it wishes to join, by sending a JOIN command to the server. The syntax of the JOIN command is in the form: "JOIN #<desired room name>."

Provided that the room exists, the server 22 will now connect the Connection and Collection Manager 12 as a chat participant within the specified room, where it will be visible with the desired NICK name specified as part of the NICK command in part (i).

Once the Connection and Collection Manager 12 has successfully connected with server 22, it will appear to be an ordinary client, and will be able to listen to all messages being broadcast by other clients as part of their real-time communication.

Depending upon user specifications, the present invention may be completely passive, in that it only listens, and never actually says anything. In this event, this inactivity will most likely be noticed by the chat server. When a chat server detects a client that has been inactive for more than a certain amount of time, it will either "PING" the client to see whether it is still "alive" or will simply log the client out. As such, the present invention can be adapted to either respond to "PING" requests with corresponding "PONG" replies, or can simply detect when it has been logged out, and immediately log back in. This preference can be specified by the user. The present invention can detect whether it has been logged out when nothing is heard for a certain amount of time (which will be user-specified), or when an exception occurs in reading from the socket or URL, implying that the socket or URL connection no longer exists.

It should be noted that the present invention provides the user with the option of simultaneously monitoring multiple live conversations in different chat rooms. To do this, the user must specify multiple "seeds", corresponding to URLs or addresses of the servers hosting these chat sessions, to the Connection and Collection Manager 12. Subsequently, the Connection and Collection Manager 12 will merely spawn off multiple (synchronized) threads, with each thread of execution corresponding to a unique conversation.

The Connection and Collection Manager 12 will directly transfer all chatcommunication data received from the server connection(s) to the Indexing Manager 14. In addition to the text of the chat message, such data will include the user name of the individual responsible for initiating the message, as well as any parameters automatically appended by the answer. Such parameters may include the email address of the chatter and his "tagline", a client-configurable line of text that gives other clients information about this client, and which can include hyperlinks, perhaps to the client's Web page, and graphics, such as the client's photo.

C) Indexing Manager 14: The Indexing Manager 14 indexes the data given to it by the Connection and Collection Manager 12. Existing indexing techniques will be employed to extract the body text, title, headers, email address(es) and URL(s) associated with each message or chat communication data. The exact details of the indexing operation can be specified by the user. The Indexing Manager 14 will pass the indexed data on to the Summary Manager 16.

D) Summary Manager 16: Summary Manager 16 will generate a user-defined, human-interpretable extendible mark-up language ("XML") summary of the indexed data given to it by the Indexing Manager 14. Such a summary will include XML tags that explicitly delineate the email address(es), URL(s), text and other attributes present in the data which are desired by the user. The Summary Manager 16 can forward the summarized data to the Database Manager 18.

E) Database Manager 18: Database Manager 18 will store the summarized data into a back-end database. Further Database Manager 18 will notify the User Interface 10 of the addition that has been made to the database 26, and the user interface 10 will update its graphical display, so that the data being summarized in real-time is immediately visible to the user. The Database Manager 18 is responsible for managing all storage activity, and referencing the stored data so as to make it accessible for rapid retrieval.

The Database Manager 18 may have search engine capability built into it. This will enable Database Manager 18 to search the contents of the database to retrieve entries that match the specifications of the Query Manager 20, whenever a search query is initiated by the user.

F) Query Manager 20: Query Manager 20 will permit the user to query the contents of the database by searching for the occurrence of one or more keywords. When the user enters a search query, Query Manager 20 will query Database Manager 18 with the keywords. Subsequently, Database Manager 18 will return a list, whose elements are pointers to database entries (as opposed to the physical entries themselves). Query Manager 20 will then notify the User Interface 10, which will display these results to the user in a separate window from that in which all the summarized content of the online communication is being displayed.

Furthermore, the query entered by the user will be persistent. This means that as the contents of the database change, Database Manager 18 will "remember" the last query made by the Query Manager 20, and will notify Query Manager 20 if any newly added data matches the query specification. In turn, Query Manager 20 will notify User Interface 10, which will dynamically update the graphical "query results" display being seen by the user, thus reflecting the addition to the database in real-time.

Query Manager 20 can also be configured to handle multiple queries at the same time. In the event that the user specifies more than one query, Query Manager 20 will merely spawn off multiple (synchronized) threads, with each thread of execution corresponding to a unique query. In this case, all of these queries will be persistent. The beauty of implementing the Query Manager 20 using threads, is that this allows Query Manager 20 to process multiple search queries in parallel, without interrupting the operation of any other component of the system.

FIG. 2 is a pictorial illustration of a typical interactive graphic display that the present invention can present to a user. For example, LISA has been configured to monitor the real-time communication in a chat room. The current activity in the chat room is illustrated in screen 100. As seen in screen 100, the typical parameters that can be monitored and stored by LISA are the message number 102, the time 104, the user name 106, the user's e-mail address 108, the URL for the user's server 110, and the message text 112. In this example, LISA was started at 17:59:12. The user can then prompt LISA and query 120 the stored results for the occurrence of the keyword "IBM."

The results of query 120 are displayed in screen 122. Each message that LISA detected and stored that includes the keyword "IBM" is displayed, along with the specified parameters.

Figure 3:
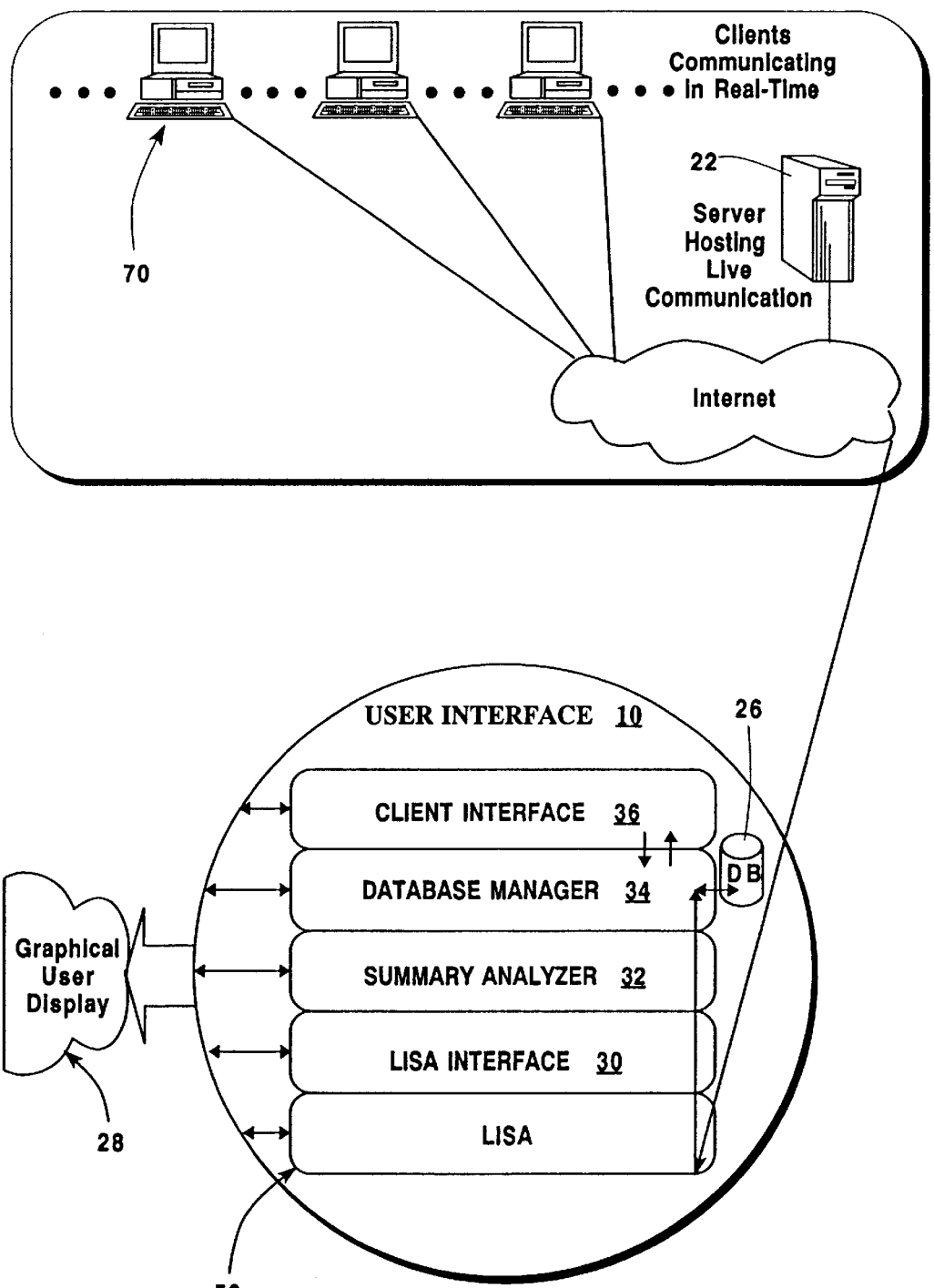
FIG. 3 is a schematic diagram of the typical components of the present invention when used for targeted advertising.

In another aspect of the present invention, the present invention may be utilized to interject dynamically customized advertising in the context of real-time user interaction on the Internet. As shown in FIG. 3, this aspect of the present invention will extract and analyze the summary information generated by LISA 50 and then respond with an appropriate message or advertisement responsive to the subject matter of the summary information. Specifically, based upon the user's specifications, the present invention will look for the temporally contiguous occurrence of a particular keyword or set of keywords. The appearance of such keywords would be used to infer the general topic or subject matter of the communication or conversation. Once the general subject area of the conversation has been (probabilistically) deduced, the present invention may be used to present advertisements in the chat room that match the theme of the conversation. This may elicit much more attention and interest from users than is paid to static advertisements. The present invention may be configured to join the conversation as a client, and can be made to respond in a personal fashion to specific individuals who are participating in the conversation.

In addition to the LISA 50 components of the present invention, this aspect of the present invention may further include the following components:

A) User Interface 10
B) LISA Interface 30
C) Summary Analyzer 32
D) Database Manager 34
E) Client Interface 36

The typical functionality of each of these components is discussed below:

A) User Interface 10.

In addition to the functionality of user interface 10 previously described, user interface 10 may also be configured to prompt the user to specify a keyword or set of keywords that are typical of subject matter that the user is interested in detecting in real-time communications. The user interface 10 may also be given a database of candidate advertisements and a mapping of keywords to advertisements. The user interface 10 can index all available advertisements in a back-end database, and will inform the database manager 34 of the database contents and mapping scheme. The advertisements in this database 60 can be of any form, including image banners, video streams or even audio presentations.

B) LISA Interface 30.

LISA Interface 30 is typically a software component that is used to link the components of this aspect of the present invention to the LISA 50 components of the present invention. The LISA Interface 30 is adapted to obtain the user-specified parameters from the User Interface 10, and configure the operation of LISA 50. The LISA Interface 30 can also be adapted to collect the summarized data output from LISA 50 and propagate this data to the Summary Analyzer 32.

C) Summary Analyzer 32.

In the targeted advertising aspect of the present invention, Summary Analyzer 32 checks the summary data for the occurrence of the keyword(s) specified by the user. Based on a partial or complete match with one or more sets of keywords, Summary Analyzer 32 will determine the probability that the summary in question is of relevance. If the deduced probability is above some user-specified threshold, the summary will be "marked" and passed on to Database Manager 34 along with the keyword(s) or sets of keywords that it was found to have matched.

D) Database Manager 34.

In a targeted advertising aspect of the present invention, database manager 34 is adapted to be able to determine which advertisement(s) from the database 60 of advertisements should be displayed in response to a particular message being exchanged in real-time between two "chatters" or clients 70. Database manager 34 may also maintain a user-specified mapping between keywords and advertisements. In the event that a given keyword maps to multiple advertisements, database manager 34 may pick randomly among the candidate advertisements. Alternatively, the user may choose to specify a ranking amongst the acceptable candidates, or impose special conditions, such as requiring a round robin scheduling, so as to avoid repetition of specific advertisements.

Once database manager 34 has selected an acceptable advertisement, database manager 34 will retrieve the advertisement from database 60. Database manager 34 will retrieve the advertisement from the database 60, and pass it on to the client interface 36, along with a listing of the "chat nicknames" of the people believed to be participating in the conversation or communication of interest. Additionally, the e-mail addresses and URLs of these people, if available from the summary generated, will also be propagated to the client interface 36 by database manager 34. The people participating in a particular conversation will usually be a subset of a total number of people present in the "chat room" at any given time. In order to be able to identify these participants, database manager 34 will need to actually "follow" the sequence and continuity of prolonged conversation of a similar theme. Database manager 34 will accomplish this by remembering the user-names of speakers of juxtaposed messages (i.e., message occurring in sequence, one after the other) which match the same keywords. The fact that sequential messages match the same keywords will be taken to indicate that these messages are related, and hence part of the same conversation.

E) Client Interface 36.

Client interface 36 is the component of the targeted advertising aspect of the present invention that can be used to form a link between the present invention and the real-time communication channel that is being monitored. Client interface 36 is responsible for presenting the advertisement to the client within the on-line communication channel. Depending on the user's specification, client interface 36 can be configured to either broadcast the advertisement to all of the participants in the channel, multicast it to the subset of users actually believed to be participating in the conversation of interest (this list of users is presented to the client interface 36 by the database manager 34), or unicast the message to a particular user.

In particular, using the information it has received from database manager 34, client interface 36 can present the advertisement in extremely customized, personalized, and interactive manner. For example, "Bob" is a participant in a conversation in which the key words "linux", "windows", "operating systems", "software", and "application", have been detected by LISA 50. Client interface 36 may now present Bob with a personal message that contains an advertisement for "red hat linux" products, and which may state something like "Hi Bob, I felt you might be interested in this !" In addition, client interface 36 may also offer to send Bob a personalized e-mail with more detailed information about the merits of "red hat" products.

The present invention includes software incorporating the process steps and instructions described above which are executed in different computers connected to the Internet.

Figure 4:
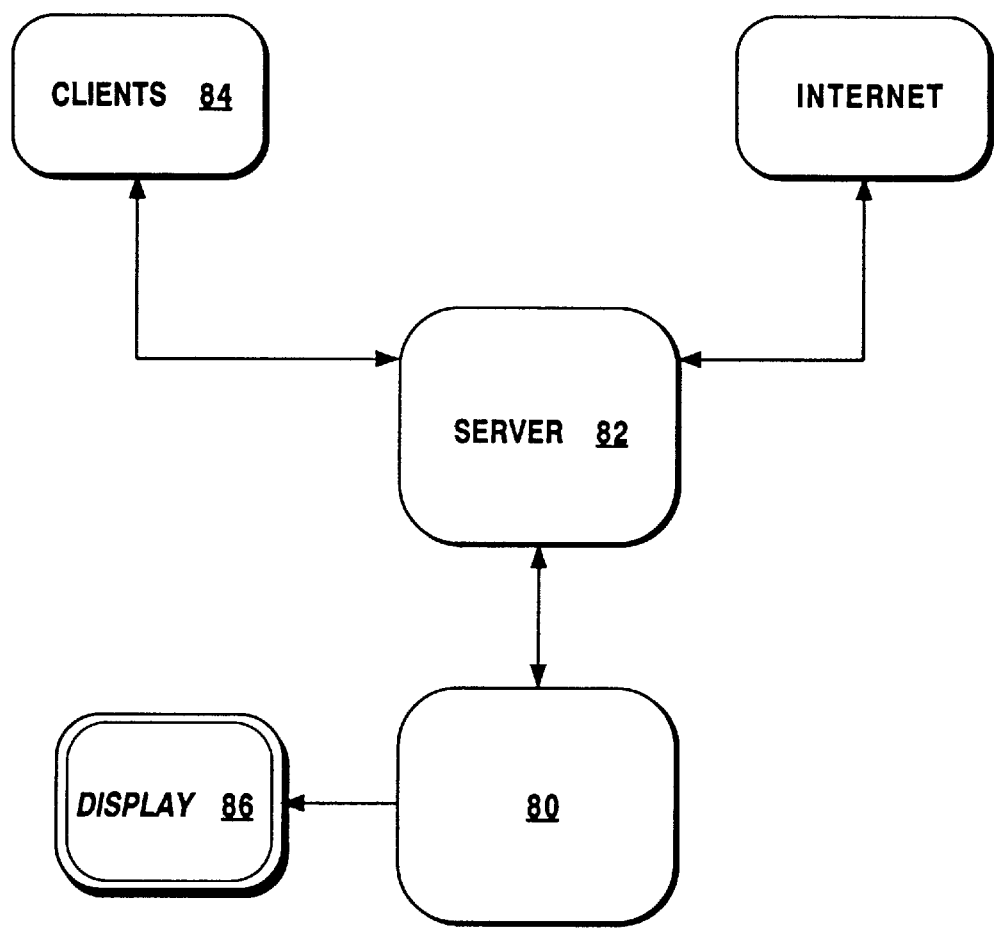
FIG. 4 is a block diagram of the typical architecture of the components of the present invention.

FIG. 4 is a schematic representation of a typical apparatus which may be used to practice the present invention. Computer system 80 may be linked to a server computer 82 such that the computers are capable of sending information to and from each computer. Information is made available to both computer systems using a communication protocol sent over a communication channel such as the Internet or through a dial-up connection, e.g., ISDN line. Computer 80 is capable of utilizing program storage devices embodying machine readable program source code which causes the computers to perform the method steps of the present invention. The program storage devices of the present invention may be devised, made and used as a component of a machine utilizing optics, magnetic properties and/or electronics to perform the method steps of the present invention. Program storage devices include, but are not limited to, magnetic media such as a diskette or computer hard drive, which is readable and executable by a computer(s), optical disks, Read Only Memory (ROM), floppy disks, and semiconductor chips. Computer 80 is linked by telephone or other conventional communication interface to the world wide web. Computer systems 80 and 82 have a microprocessor for executing stored programs and computer system 80 may include a data storage device on its program storage device for storage of information and data. The computer program or software incorporating the method steps and instructions described may be stored in both computer(s) and network server on an otherwise conventional program storage device. A screen or display 86 is able to display the desired results accessed from the computer 80.

The present invention thus provides a method and system to gather and analyze dynamic information from a real-time communication on the Internet, such as in a chat room, and target a message back to the participants which is responsive to the topic of the communication.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for automatically gathering, summarizing and indexing real-time information derived from a real-time communication on a computer network between at least a first participant and a second participant, the method comprising the steps of:
   connecting with at least one server, said server including at least one site where real-time communication is taking place;
   connecting with said site on said server;
   monitoring said real-time communication occurring within said site, said real-time communication comprising at least one block of real-time communication data;
   retrieving said at least one block of real-time communication data;
   indexing said at least one block of real-time communication data, said indexing including extracting at least one parameter from said block of real-time communication data; and
   summarizing in real-time said indexed block of real-time communication data, said summarized block of real-time communication data including at least one tag to identify said parameter.

2. The method of claim 1 wherein said connecting with said server comprises opening a socket based connection using a transmission control protocol/network protocol ("TCP/IP").

3. The method of claim 2 wherein said opening a socket based connection using a TCP/IP comprises the steps of:
   opening an input and an output socket to said server;
   sending said server a first command to request a connection;
   receiving a unique session identification message from said server;
   sending a confirming unique session identification message to said server;
   sending a registration message to said server, said registration message comprising a username, hostname, servername, real firstname and real lastname;
   sending a second command to said server specifying a chatroom to join, said chatroom comprising said site on said server where said real-time communication is taking place.

4. The method of claim 1 wherein said at least one parameter is selected from the group consisting of a body text, title, header, e-mail address and uniform resource locator associated with said block of communication data.

5. The method of claim 1 wherein said step of summarizing said data comprises the step of generating an extensible markup language summary of said data, said summary including extensible markup language tags to delineate said parameters.

6. The method of claim 1 further comprising the step of storing said summarized block of real-time communication data in a database, said database adapted to be queried for at least one keyword, said keyword associated with said block of real-time communication data.

7. The method of claim 6 further comprising the steps of:
   querying said database for the occurrence of said at least one keyword;
   identifying at least one database entry corresponding to said summarized block of data including said keyword;
   displaying said at least one database entry including said keyword.

8. A method for automatically gathering, summarizing and indexing real-time information derived from a real-time communication on a computer network between at least a first participant and a second participant, the method comprising the steps of:
   connecting with at least one server, said server including at least one site where said real-time communication is taking place;
   connecting with said site on said server;
   monitoring said real-time communication, said real-time communication comprising at least one block of communication data;
   retrieving said at least one block of communication data;
   processing said at least one block of communication data, said processing including extracting at least one parameter from said block of communication data; and
   summarizing said data, said summarized data including at least one tag to identify said parameter;
   identifying at least one first keyword to detect during said real-time communication;
   analyzing said summarized data for the occurrence of said at least one first keyword;
   selecting at least one message from a message database, said message being associated with said first keyword; and interjecting said at least one message back to said site of said real-time communication, said at least one message being detectable by at least said first participant.

9. The method of claim 8 wherein said message is selected from the group consisting of image banners, video streams and audio presentations.

10. The method of claim 8 wherein said message is detectable by a plurality of first and second participants.

11. The method of claim 8 wherein said message in said message database is mapped to at least one of a plurality of key words to be detected.

12. The method of claim 8 wherein said at least one first keyword is mapped to a plurality of messages in said message database.

13. The method of claim 8 wherein said message is personalized for at least said first participant.

14. An article of manufacture comprising:

a computer usable medium having computer readable program code means embodied therein for causing a computer to automatically gather, summarize and index real-time information derived from a- real-time communication on a computer network between at least a first participant and a second participant, the computer readable program code means in said article of manufacture comprising:

computer readable program code means for causing a computer to connect with at least one server, said server including at least one site where real-time communication is taking place;

computer readable program code means for causing a computer to connect with said site on said server;

computer readable program code means for causing a computer to monitor said real time communication occurring within said site, said real-time communication comprising at least one block of real-time communication data;

computer readable program code means for causing a computer to retrieve said at least one block of real-time communication data;

computer readable program code means for causing a computer to index said at least one block of real-time communication data, said indexing including the step of extracting at least one parameter from said block of real-time communication data; and computer readable program code means for causing a computer to summarize in real-time said indexed block of real-time communication data, said summarized block of real-time communication data including at least one tag to identify said parameter.

15. The article of claim 14 further comprising:

computer readable program code means for causing a computer to store said summarized block of communication data in a database;

computer readable program code means for causing a computer to query said database for the occurrence of said at least one keyword;

computer readable program code means for causing a computer to identify at least one database entry corresponding to a summarized block of data including said keyword;

computer readable program code means for causing a computer to display said at least one database entry corresponding to a summarized block of data including said keyword on a screen visible to at least said first participant.

16. An article of manufacture comprising:

a computer usable medium having computer readable program code means embodied therein for causing a computer to automatically gather, summarize and index real-time information derived from a real-time communication on a computer network between at least a first participant and a second participant, the computer readable program code means in said article of manufacture comprising:

computer readable program code means for causing a computer to connect with at least one server, said server including at least one site where said real-time communication is taking place;

computer readable program code means for causing a computer to connect with said site on said server;

computer readable program code means for causing a computer to monitor said real-time communication, said real-time communication comprising at least one block of communication data;

computer readable program code means for causing a computer to retrieve said at least one block of communication data;

computer readable program code means for causing a computer to process said at least one block of communication data, said processing including the step of extracting at least one parameter from said block of communication data;

computer readable program code means for causing a computer to summarize said data, said summarized data including at least one tag to identify said parameter;

computer readable program code means for causing a computer to identify at least one first keyword to detect during said real-time communication;

computer readable program code means for causing a computer to analyze said summarized data for the occurrence of said at least one first keyword;

computer readable program code means for causing a computer to select at least one message from a message database, said message being associated with said first keyword; and computer readable program code means for causing a computer to interject said at least one message back to said site of said real-time communication, said at least one message being detectable by at least said first participant.

17. A computer program product comprising:

a computer usable medium having computer readable program code means embodied in said medium for causing a computer to automatically gather, summarize and index real-time information derived from a real-time communication on a computer network between at least a first participant and a second participant, the computer readable program code means in said article of manufacture comprising:

computer readable program code means for causing a computer to connect with at least one server, said server including at least one site where real-time communication is taking place;

computer readable program code means for causing a computer to connect with said site on said server;

computer readable program code means for causing a computer to monitor said real-time communication occurring within said site, said real-time communication comprising at least one block of real-time communication data;

computer readable program code means for causing a computer to retrieve said at least one block of real-time communication data;

computer readable program code means for causing a computer to index said at least one block of real-time communication data, said indexing including the step of extracting at least one parameter from said block of real-time communication data; and computer readable program code means for causing a computer to summarize in real-time said indexed block of real-time communication data, said summarized block of real-time communication data including at least one tag to identify said parameter.

18. The computer program product of claim 17 further comprising:

computer readable program code means for causing a computer to store said summarized block of real-time communication data in a database;

computer readable program code means for causing a computer to query said database for the occurrence of a keyword;

computer readable program code means for causing a computer to identify at least one database entry corresponding to a summarized block of data including said keyword;

computer readable program code means for causing a computer to display said at least one database entry corresponding to said summarized block of data including said keyword on a screen visible to at least said first participant.

19. A computer program product comprising:

a computer usable medium having computer readable program code means embodied in said medium for causing a computer to automatically gather, summarize and index real-time information derived from a real-time communication on a computer network between at least a first participant and a second participant, the computer readable program code means in said article of manufacture comprising:

computer readable program code means for causing a computer to connect with at least one server, said server including at least one site where said real-time communication is taking place;

computer readable program code means for causing a computer to connect with said site on said server;

computer readable program code means for causing a computer to monitor said real-time communication, said real-time communication comprising at least one block of communication data;

computer readable program code means for causing a computer to retrieve said at least one block of communication data;

computer readable program code means for causing a computer to process said at least one block of communication data, said processing including the step of extracting at least one parameter from said block of communication data;

computer readable program code means for causing a computer to summarize said data, said summarized data including at least one tag to identify said parameter;

computer readable program code means for causing a computer to identify at least one first keyword to detect during said real-time communication;

computer readable program code means for causing a computer to analyze said summarized data for the occurrence of said at least one first keyword;

computer readable program code means for causing a computer to select at least one message associated with said first keyword; and computer readable program code means for causing a computer to interject said at least one message back to said site of said real-time communication, said at least one message being detectable by at least said first participant.

20. A method for targeting a message to at least one participant in the context of a real-time communication on a computer network, the method comprising the steps of:

connecting to at least one site of at least one real-time communication on a computer network;

monitoring said real-time communication for the occurrence of at least one keyword associated with a block of real-time communication data by the steps of;

retrieving said at least one block of real-time communication data;

summarizing in real-time said block of real-time communication data;

storing said summarized block of real-time communication data in a database;

querying said database for the occurrence of said at least one keyword;

generating at least one message responsive to said at least one keyword;

interjecting said at least one message onto said site of said real-time communication, said message being capable of being detected in real-time by said at least one participant in said real-time communication.

21. The method of claim 1 further including the step of interjecting a message associated with a keyword from said summarized data to said site during said real-time communication, said message being detectable by at least said first participant.

22. The method of claim 1 wherein said site where said real-time communication is taking place comprises a chat room.

23. The method of claim 22 wherein said real-time communication data comprises chat communication data.

* * * * *